US007936946B2

(12) United States Patent
Bhatt et al.

(10) Patent No.: US 7,936,946 B2
(45) Date of Patent: May 3, 2011

(54) MIGRATION FOR OLD IMAGE DATABASE

(75) Inventors: Nikhil M. Bhatt, Cupertino, CA (US); Curtis A. Bianchi, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 1032 days.

(21) Appl. No.: 11/710,109

(22) Filed: Feb. 23, 2007

(65) Prior Publication Data
US 2008/0205794 A1 Aug. 28, 2008

(51) Int. Cl.
*G06K 9/36* (2006.01)
(52) U.S. Cl. ........................................ 382/276
(58) Field of Classification Search ............ 348/E3.029; 382/276
See application file for complete search history.

(56) References Cited

U.S. PATENT DOCUMENTS

| | | | |
|---|---|---|---|
| 4,343,037 A | 8/1982 | Bolton | |
| 5,283,557 A | 2/1994 | Memarzadeh | |
| 5,636,036 A | 6/1997 | Ashbey | |
| 5,638,523 A | 6/1997 | Mullet et al. | |
| 5,675,358 A * | 10/1997 | Bullock et al. | 345/420 |
| 5,754,348 A | 5/1998 | Soohoo | |
| 6,005,679 A | 12/1999 | Haneda | |
| 6,085,112 A | 7/2000 | Kleinschmidt et al. | |
| 6,101,431 A | 8/2000 | Niwa et al. | |
| 6,111,586 A | 8/2000 | Ikeda et al. | |
| 6,130,665 A | 10/2000 | Ericsson | |
| 6,175,841 B1 * | 1/2001 | Loiacono | 715/205 |
| 6,243,724 B1 | 6/2001 | Mander et al. | |
| 6,253,218 B1 * | 6/2001 | Aoki et al. | 715/201 |
| 6,415,320 B1 | 7/2002 | Hess et al. | |
| 6,731,316 B2 | 5/2004 | Herigstad et al. | |
| 6,738,154 B1 | 5/2004 | Venable | |
| 7,096,117 B1 | 8/2006 | Gale et al. | |
| 7,164,423 B1 | 1/2007 | Westen | |
| 7,202,878 B2 | 4/2007 | Safadi et al. | |
| 7,480,872 B1 | 1/2009 | Ubillos | |
| 2001/0014184 A1 | 8/2001 | Bubie et al. | |
| 2001/0022564 A1 * | 9/2001 | Youngquist et al. | 345/55 |
| 2001/0056434 A1 | 12/2001 | Kaplan et al. | |
| 2002/0008721 A1 | 1/2002 | Fahraeus et al. | |

(Continued)

FOREIGN PATENT DOCUMENTS

EP 1 369 792 A2 12/2003

(Continued)

OTHER PUBLICATIONS

Shneiderman, Ben, et al., "A Photo history of SIGCHI: evolution of design from personal to public, interactions", ACM, vol. 9, Issue 3, May 2002, 7 pages.

(Continued)

*Primary Examiner* — Gregory F Cunningham
(74) *Attorney, Agent, or Firm* — Hickman Palermo Truong & Becker LLP

(57) ABSTRACT

Techniques are described for causing digital image data to be interpreted according to a particular technique of a plurality of techniques. According to an embodiment, digital sensor data is received, and user input is received that specifies which technique of a plurality of techniques to use to generate a display that depicts an unmodified image from the sensor data, wherein each technique of the plurality of techniques generates a display from the sensor data in a different manner than each other technique of the plurality of techniques.

30 Claims, 7 Drawing Sheets

U.S. PATENT DOCUMENTS

| | | | |
|---|---|---|---|
| 2002/0054172 A1* | 5/2002 | Berman et al. | 345/856 |
| 2002/0070982 A1 | 6/2002 | Hill et al. | |
| 2002/0158973 A1 | 10/2002 | Gomi | |
| 2002/0191867 A1 | 12/2002 | Le et al. | |
| 2003/0038787 A1 | 2/2003 | Nishiyama | |
| 2003/0084065 A1 | 5/2003 | Lin et al. | |
| 2003/0095697 A1 | 5/2003 | Wood et al. | |
| 2003/0123713 A1 | 7/2003 | Geng | |
| 2003/0179154 A1 | 9/2003 | Demsky et al. | |
| 2003/0189602 A1 | 10/2003 | Dalton et al. | |
| 2003/0223650 A1 | 12/2003 | Kim | |
| 2003/0227468 A1 | 12/2003 | Takeda | |
| 2004/0111332 A1 | 6/2004 | Baar et al. | |
| 2004/0240709 A1 | 12/2004 | Shoemaker | |
| 2005/0134610 A1 | 6/2005 | Doyle et al. | |
| 2005/0163378 A1 | 7/2005 | Chen | |
| 2005/0177783 A1 | 8/2005 | Agrawala et al. | |
| 2005/0179705 A1 | 8/2005 | Ubillos et al. | |
| 2005/0197763 A1 | 9/2005 | Robbins et al. | |
| 2005/0206734 A1* | 9/2005 | Kubo et al. | 348/207.1 |
| 2005/0262447 A1 | 11/2005 | Shoemaker | |
| 2006/0220986 A1 | 10/2006 | Takabe et al. | |
| 2007/0035551 A1 | 2/2007 | Ubillos | |
| 2007/0041030 A1* | 2/2007 | Kojima | 358/1.13 |
| 2007/0216782 A1* | 9/2007 | Chernoff | 348/231.99 |
| 2008/0089580 A1* | 4/2008 | Marcu | 382/162 |
| 2010/0079495 A1* | 4/2010 | Ubillos et al. | 345/660 |

FOREIGN PATENT DOCUMENTS

| | | |
|---|---|---|
| EP | 1369792 A2 | 12/2003 |
| GB | 2310988 A | 9/1997 |
| WO | WO 93/22738 A1 | 11/1993 |

OTHER PUBLICATIONS

European Patent Office, "Communication pursuant to Article 96(2) EPC", Foreign Application No. PCT/US2005/035938, 7 pages.
Claims, Foreign Application No. PCT/US2005/035938, 4 pages.
International Business Machines Corporation, "Automated/customized method for window tiling", Research Disclosure Database No. 444135, published Apr. 2001, 3 pages.
State Intellectual Property Office of the People'S Republic of China, "The First Office Action", application No. 2005800342883, Dated Oct. 16, 2008, 23 pages.
Clean Claims, application No. 2005800342883, 6 pages.
Graham, Adrian, et al., "Time as Essence for Photo Browsing Through Personal Digital Libraries", JCDL 2002, Copyright ACM, Jul. 2002, 10 pages.
Mander, Richard, et al., "A Pile Metaphor for Supporting Casual Organization of Information", Copyright ACM, 1992, 8 pages.
European Patent Office, "Communication pursuant to Article 96(2) EPC", Foreign Application No. PCT/US2005/035943, 8 pages.
Claims, Foreign Application No. PCT/US2005/035943, 5 pages.
Apple Computer, Inc., "A 'Pile' Metaphor for Supporting Casual Organization of Information", ACM CHI '92, published May 1992, 8 pages.
Janssen, William C., et al., "UpLib: A universal personal digital library system", Nov. 2003, ACM, 9 pages.
Baudisch, Patrick, et al., "Keeping Things in Context: A Comparative Evaluation of Focus Plus Context Screens, Overviews, and Zooming", Information Sciences and Technologies Lab/Computer Science Lab Xerox, Palo Alto Research Center, Apr. 2002, 8 pages.
Graham, Adrian et al., "Time as essence for photo browsing through personal digital libraries", Proceedings of the $2^{nd}$ ACM/IEEE-CS joint conference on Digital libraries JCDL '02, Jul. 2002, 10 pages.
Rodden, Kerry, et al., "How do people manage their digital photographs?", Proceedings of the SIGCHI conference on Human factors in computing systems CHI '03, Apr. 2003, 8 pages.
Baudisch, et al., "Focus Plus context screens: displays for users working with large visual documents", ACM, CHI 2002, extended abstracts on human factors in computing systems, Apr. 2002, 2 pages.
Mander, et al., "A Pile metaphor for supporting casual organization of information", ACM, CHI 1992, Proceedings of the SIGCHI conference on Human factors in computing systems, Jun. 1992, 8 pages.
Ware, et al., "The DragMag image magnifier", ACM, CHI 1995, Conference companion on human factors in computing systems, May 1995, 2 pages.
Perlin, K. et al., "An Alternative Approach to the Computer Interface" (1993) 11 pages.
"Text of the Second Office Action" received in Application Serial No. 200580034288.3 dated May 15, 2009 (2 pages).
Current claims of Application Serial No. 200580034288.3, Jun. 2009 (14 pages).
"Summons to attend oral proceeding pursuant to Rule 115(1) EPC" received in Application Serial No. 05256232.9-1225/1645950 dated Jun. 16, 2009 (8 pages).
Current claims of Application Serial No. 05256232.9-1225/1645950 as of Jul. 2009 (3 pages).
The DragMag image magnifieir Colin Ware, Marlon Lewis May 1995 Conference companion on Human factors in computing systems CHI '95 Publisher: ACM Press.
A magnifier tool for video data Michael Mills, Jonathan Cohen, Yin Yin Wong Jun. 1992 Proceedings of the SIGCHI conference on Human factors in computing systems CHI '92 Publisher: ACM Press.
European Patent Office, "Communication pursuant to Article 94(3) EPC", application No. 05805830.6-1245, dated Dec. 2, 2009, 5 pages.
Claims, application No. 05805830.6-1245, 3 pages, 2008.
International Business Machines Corporation, "Automated/Customized Method for Window Tiling", research disclosure database No. 444135, Kenneth Mason Publications Ltd., Apr. 2001, 3 pages.
European Patent Office, "Communication Pursuant to Article 94(3) EPC", Application No. 05805830.6-1245, received May 28, 2008, 11 pages.

* cited by examiner

MIGRATION FOR OLD IMAGE DATABASE

RELATED APPLICATIONS

This application is related to: (1) pending non-provisional application Ser. No. 10/960,888, filed on Oct. 6, 2004, by Randy Ubillos, Laurent Perrodin, Dan Waylonis, Stan Jirman, Sarah Brody and Mike Mages, entitled "Displaying Digital Images using Groups, Stacks, and Version Sets;" (2) pending non-provisional application Ser. No. 10/960,887, filed on Oct. 6, 2004, by Randy Ubillos, Laurent Perrodin and Dan Waylonis, entitled "Techniques for Displaying Digital Images on a Display;" and (3) pending non-provisional application Ser. No. 11/329,330, filed on Jan. 9, 2006, by Joshua Fagans and Timothy Benjamin Martin, entitled "Compare Mode for Variable Number of Images." The entire disclosures of the above applications are hereby incorporated by reference for all purposes as if fully set forth herein.

FIELD OF THE INVENTION

The present invention relates to digital image data and, more specifically, to an approach for migrating digital image data to particular techniques for interpreting and displaying the digital image data.

BACKGROUND

Digital image data, such as photographs taken by a digital camera, originate as minimally processed data from the image sensor of a digital camera or image scanner. When a digital camera makes an exposure, the imaging chip records the amount of light that has hit each pixel, or photo site. This is recorded as a voltage level. The camera's analog to digital circuitry now changes this analog voltage signal into a digital representation. Depending on the camera's circuitry, either 12 or 14 bits of data are recorded, in current technology.

A "RAW" image file contains this minimally processed data from the image sensor of a digital camera or image scanner. RAW files are so named because they are not yet processed and capable of being displayed in a visually intelligible manner, ready to use with a bitmap graphics editor, printed, or by a typical web browser. Under current approaches, the RAW image data must be processed and converted to an RGB format such as TIFF or JPEG before it can be manipulated.

There is no single RAW format: different manufacturers use their own proprietary formats, which are collectively known as RAW format. The term RAW may refer to the data comprising the image files or the format of those files. The RAW image data and its shooting parameters are kept apart until they meet at a RAW conversion stage. This means that changes can be made to the exposure (brightness and contrast), white balance, saturation, sharpness and many other parameters using the RAW image data from the camera or scanner.

The RAW conversion is an interpretation of the digital sensor data performed by a technique, such as a particular algorithm. Currently, cameras that support RAW files typically come with proprietary software for interpretation and conversion of their RAW files to TIFF or JPEG. Other conversion programs and plug-ins are available that have either licensed the technology from the camera manufacturer or reverse-engineered the particular RAW format.

A current approach to generating a display of the sensor data; i.e., interpreting the sensor data into a visually intelligible item such as a digital image, is to interpret the sensor data using a particular technique and modify the image from the sensor data by converting the interpreted RAW data into another format such as JPEG, TIFF, or PSD. Then a user may make image adjustments, such as eliminating red-eye, removing dust, cropping, or organizing images.

A drawback to the current approach is that techniques for interpreting sensor data are often changed; for example, they may be ostensibly improved or refined. As a result, images produced by using the new techniques may look different than images produced by a previous iteration of the technique. Many users apply custom adjustments to their images after processing the sensor data, such as custom filters that alter color levels, white balance, etc. Therefore, a user desiring to interpret the sensor data using a new version of the technique may find that the custom adjustments no longer result in an acceptable image.

Current approaches use an "all-or-nothing" approach, where a new version of the technique is installed, for example as a plug-in, and all future sensor data is interpreted using the newly-installed technique. A drawback to this approach is that a user may find that the new technique produces unacceptable results, such as rendering custom filters unusable, as discussed above. Under current approaches, then a user must de-install the plug-in or other approach for applying the new technique and re-install the previous technique, with no guarantee that the previous technique may even be located and re-installed.

In current approaches, it is the responsibility of the user to manage these various plug-ins and techniques, and to try to discern what, if any, changes have occurred in the RAW processing. Because current approaches do not allow users to run more than one version of the decode plug-in, or otherwise utilize more than one version of the decoding techniques at the same time, it is impractical to compare different decoding versions.

FIG. 1 is a block diagram illustrating a current approach to interpreting RAW image files. In FIG. 1, a collection of RAW data, for example four RAW image files 104a-104d representing four digital photographs, reside in storage 102. Storage 102 may be a flash memory card, a hard drive, a DVD, or any other type of non-volatile storage medium. The RAW image files 104a-104d are comprised of sensor data, which is not viewable as a digital image and may be in a manufacturer-specific format.

In order to view the RAW image files 104a-104d as visible digital images, the RAW image files 104a-104d must be interpreted by a RAW processing technique, such as an algorithm. In FIG. 1, there are two RAW interpretation techniques 106, 114 that may be used to interpret the RAW image files 104a-104d. These techniques may be embodied, for example, in a "plug-in" module or other type of installable executable instructions. However, under current approaches, only one of the interpretation techniques 106, 114 is available for use at one time. FIG. 1 illustrates an alternative flow of data. The RAW image files 104a-104d may either be processed by the first technique 106 or the second technique 114, but in order to use the second technique 114, the first technique 106 must be made unavailable; for example by uninstalling a plug-in that comprises the first technique 106 and installing a plug-in that comprises the second technique 114.

In FIG. 1, the RAW image files 104a-104d are transmitted to the first technique 106, for example by plugging storage 102 such as a memory card containing the RAW image files 104a-104d into a computer and causing the RAW image files 104a-104d to be read by a program embodying the first technique 106. The first technique 106 takes the sensor data comprising the RAW image files 104a-104d and interprets the data into fully defined pixels. Fully defined pixels are pixels for which a color value has been defined.

After the RAW image files 104a-104d have been interpreted by the first technique 106, they are transmitted to storage 108, for example a hard drive, and stored as image files 110a-110d, such as a TIFF file or a JPEG file, in which the color values for every pixel have been defined. Once the pixels for the image files 110a-110d have been defined and stored, then the image files 110a-110d may be modified by one or more operations 112, such as one or more filters, or removing dust specks or red-eye reduction. In the current approaches, the operations 112 need to work with a defined set of pixel data, which is not defined until the RAW data has been interpreted by an interpretation technique 106, 114.

In the example illustrated by FIG. 1, a user wishes to use a new RAW interpretation technique 114 to interpret the RAW image files 104a-104d. In order to do this, the first technique 106 must be made unavailable under current approaches, for example by being uninstalled. After installing or otherwise making available the new RAW interpretation technique 114, the RAW image files 104a-104d must be re-interpreted by the new technique 114 prior to being viewed and modified. After the RAW image files 104a-104d are re-interpreted by the new technique 114, they are transmitted to storage 116, for example a hard drive, and stored as image files 118a-118d, such as a TIFF file or a JPEG file, in which the color values for every pixel have been defined. Because the new RAW interpretation technique 114 operates in a different manner than the previous technique 106, the image files 118a-118d may look different. These image files 118a-118d may then be modified by one or more operations 112, such as one or more filters, or removing dust specks or red-eye reduction.

A drawback to the current approach illustrated in FIG. 1 is that various iterations of techniques for interpreting sensor data are not able to be applied on an image-by-image basis, because of the all-or-nothing approach described above. Currently, sensor data is interpreted by a particular technique and then the defined pixels are stored into another format such as JPEG, TIFF, or PSD. These files can take up large amounts of storage space. If a user installs a new technique for interpreting sensor data, and desires to interpret the sensor data that was previously interpreted using a prior technique, then the sensor data is interpreted using the new technique and again modified by being stored into another format such as JPEG, TIFF, or PSD. This results in multiple interpretations/decodes of the same image, taking up even greater amounts of storage space.

Therefore, an approach that allows for selecting a particular technique for interpreting sensor data is desirable. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
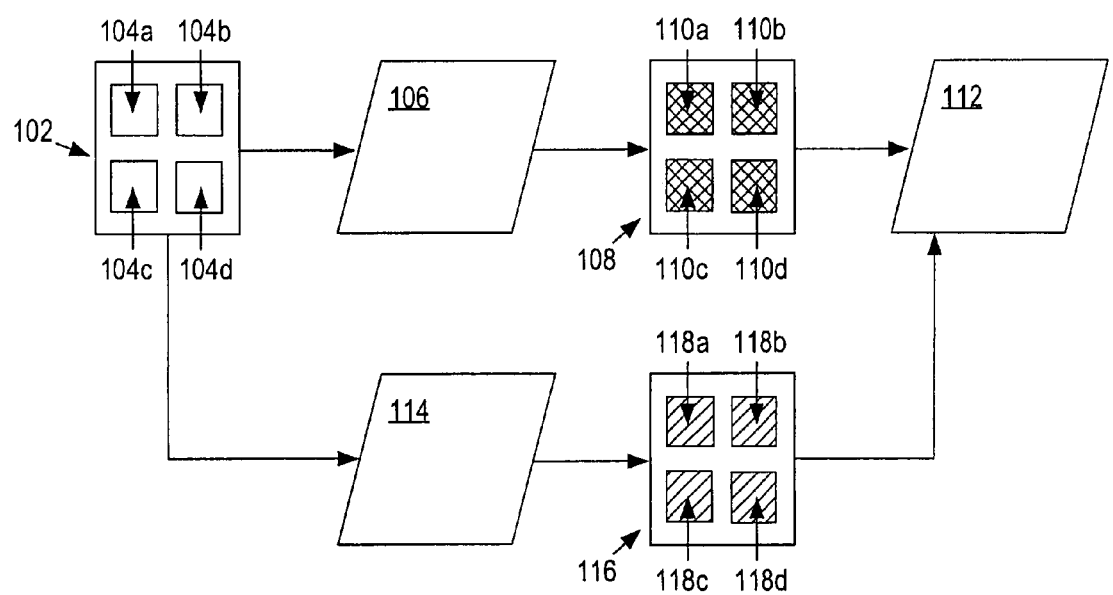
FIG. 1 is a block diagram illustrating a current approach to interpreting RAW image files.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described for causing digital image data to be interpreted according to a particular technique of a plurality of techniques, wherein the particular technique is selected based on user input.

According to an embodiment, digital sensor data is received, and user input is received that specifies which technique of a plurality of techniques to use to generate a display that depicts an unmodified image from the sensor data, wherein each technique of the plurality of techniques generates a display from the sensor data in a different manner than each other technique of the plurality of techniques.

According to an embodiment, a first unmodified display of a digital image is generated, wherein the first display depicts sensor data as interpreted by a first technique of a plurality of techniques. A second unmodified display of a digital image is generated, wherein the second display depicts sensor data as interpreted by a second technique of a plurality of techniques. The first digital image and the second digital image, as interpreted by the respective techniques, are displayed concurrently.

According to an embodiment, a digital image is selected wherein the digital image is generated from sensor data, and the image is generated based on a first technique of a plurality of techniques for interpreting sensor data. User input is received that specifies a second technique of a plurality of techniques for interpreting sensor data, and in response to the user input, a new version of the digital image is generated based on the second technique, without causing the sensor data to be modified.

According to an embodiment, user input is received selecting a first version of a technique for modifying the display of a digital image. In response to receiving the user input, the display of a digital image is modified in accordance with the first version of the technique. Input is received comprising a second version of the technique, and the second version of the technique is made for modifying the display of the digital image without causing the first version of the technique to be unavailable. User input selecting the second version of the technique is received, and in response to receiving the user input, the display of the digital image is modified in accordance with the second version of the technique. After modifying the display of the digital image in accordance with the second version of the technique, user input is received selecting the first version of the technique without causing the second version of the technique to be unavailable. In response to receiving the user input, the display of the digital image is modified in accordance with the first version of the technique.

Migration for Old Image Database

According to an embodiment, digital sensor data is received, for example, by importing digital image data from a digital camera or importing sensor data that has previously been imported from a digital camera. This sensor data may be in what is collectively known as the RAW data format, although different manufacturers may call the file containing the sensor data a different name. In order for the sensor data to be rendered into a visually intelligible form, a technique is performed on the sensor data that generates a display of the sensor data. The resulting display is an unmodified image from the sensor data as interpreted by the technique. The term "unmodified image" in this context means data or a digital image as interpreted from sensor data that has not undergone any alterations such as being stored in another format such as JPEG or TIFF.

According to an embodiment, the sensor data is stored as a file; for example, RAW data (or sensor data in another particular format) comprising each digital photograph taken by a digital camera is stored in a discrete file. Each of these files is interpreted by a particular technique, such as an algorithm that interprets the RAW data, and in response to the interpretation, a visually perceptible display is generated. For example, a file containing RAW data is interpreted by a particular technique, and a visual image of the photograph defined by the RAW data is displayed.

According to an embodiment, the resulting visual image is not stored as a file; for example, as a JPEG or TIFF file. Instead, the RAW data is interpreted dynamically by the particular technique and any modifications made to the visual image, such as improving exposure, increasing edge sharpness, or eliminating dust spots, are stored as an instruction set, for example in a database. The RAW data upon which the visual image is based is not changed in any way. According to an embodiment, the original visual image as interpreted by the particular technique is stored as a version, and any future modifications may be stored as an additional version. The version doesn't store the RAW data, just the instructions about how to interpret it; for example, the parameters to the RAW processing code and which version of the RAW processing technique to employ.

New techniques to interpret sensor data may be released by various entities, such as an upgrade to the RAW interpretation algorithm, and a user may desire to use the new technique to interpret existing sensor data. As in the above example, a user may have a library of images stored in RAW format, each image stored in one or more files comprising sensor data. To view the images, the underlying sensor data is interpreted by a technique that causes a visual display of the image instead of merely having the sensor data interpreted and the resulting interpretation stored as a file, such as a TIFF or JPEG image file, and displaying the TIFF or JPEG file.

Once a new technique has been made available to interpret the stored and/or new sensor data, such as by upgrading a software program or installing a new plug-in, a user can choose whether to use the previous technique or new technique to interpret the sensor data. As more new techniques are made available, for example by installing new versions of techniques, all the installed techniques are available and a user may choose from all available techniques. Unlike previous approaches, in order to use a prior technique, there is no need to de-install a current technique and re-install the desired version of the previous technique.

Figure 2:
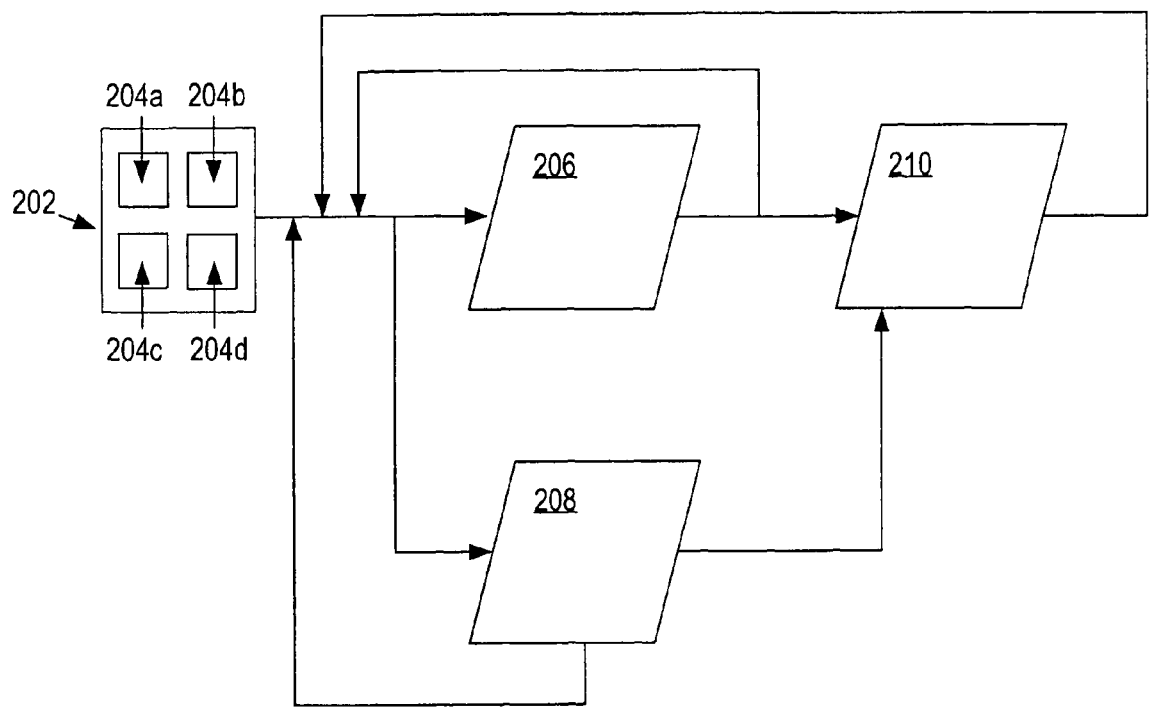
FIG. 2 is a block diagram of an embodiment illustrating an approach to interpreting RAW image files.

FIG. 2 is a block diagram of an embodiment illustrating an approach to interpreting RAW image files. In FIG. 2, a collection of RAW data, for example four RAW image files 204a-204d representing four digital photographs, reside in storage 202. Storage 202 may be a flash memory card, a hard drive, a DVD, or any other type of non-volatile storage medium. The RAW image files 204a-204d are comprised of sensor data, which is not viewable as a digital image and may be in a manufacturer-specific format.

In order to view the RAW image files 204a-204d as visible digital images, the RAW image files 204a-204d must be interpreted by a RAW processing technique, such as an algorithm. In FIG. 2, there are two RAW interpretation techniques 206, 208 that may be used to interpret the RAW image files 204a-204d. According to an embodiment, the RAW image files 204a-204d are transmitted to either of the interpretation techniques 206, 208. Both interpretation techniques 206, 208 are available concurrently and the particular one used may be a "default" technique which is used for all transmitted RAW image files without user intervention, or a user may choose which of the available interpretation techniques 206, 208 to use. According to an embodiment, this choice may be in response to user input received through a user interface element.

Once the RAW image files 204a-204d have been interpreted by the particular technique of the available techniques 206, 208, the technique taking the sensor data comprising the RAW image files 204a-204d and interpreting the data into fully defined pixels, the resulting pixels may be displayed as an image file. According to an embodiment, the fully defined pixels, as output by the particular technique, are not stored as an image file such as JPEG or TIFF, but are instead dynamically interpreted for display by the particular technique of the available techniques. According to an embodiment, the fully defined pixels may be stored as an instruction set in a database.

According to an embodiment, the fully defined pixels are transmitted from the particular technique of the available techniques 206, 208 to one or more operations 210 that modify the pixel data and therefore the display of the pixel data, such as one or more filters, or an operation to remove dust specks or provide red-eye reduction. The operations 210 need to work with a defined set of pixel data, which is not defined until the RAW data has been interpreted by an interpretation technique 206, 208. According to an embodiment, the modified pixel data may be stored as an instruction set in a database. According to an embodiment, the modified pixel data may be exported to storage and may be stored in an image file format such as JPEG or TIFF.

According to an embodiment, after the RAW image files 204a-204d are interpreted by any of the available techniques 106, 108, the output may be returned to any of the available techniques 106, 108 for reinterpretation. For example, the RAW image files 204a-204d are transmitted to the first technique 206, for example by plugging storage 202 such as a memory card containing the RAW image files 204a-204d into a computer and causing the RAW image files 204a-204d to be read by a program embodying the first technique 206. The first technique 206 takes the sensor data comprising the RAW image files 204a-204d and interprets the data into fully defined pixels. The output from the first technique 206 may be displayed as a digital image and transmitted to an operation 210 such as a filter, or simply viewed.

The user then installs a new RAW interpretation technique 208 and desires to view the RAW image files 204a-204d as interpreted by the new technique 208. According to an embodiment, the use selects one or more of the digital image displays of the RAW image files 204a-204d as currently interpreted by the first technique 206, and chooses to reinterpret the underlying RAW image files 204a-204d according to the new technique 208. In response, the RAW image files 204a-204d are interpreted by the new technique 208 and the reinterpreted output may be displayed and/or modified by an operation 210 without saving the output as an image file such as TIFF or JPEG.

If the user desires to return to viewing the RAW image files 204a-204d as interpreted by the first technique 206, the user may select one or more of the digital image displays of the RAW image files 204a-204d as currently interpreted by the new technique 208, and choose to interpret the underlying RAW image files 204a-204d according to the first technique 206. In response, the RAW image files 204a-204d are reinterpreted by the first technique 208 and the reinterpreted output may be displayed and/or modified by an operation 210 without saving the output as an image file such as TIFF or JPEG.

According to an embodiment, the RAW image files 204a-204d are dynamically interpreted by any of the available techniques and the resulting fully defined pixels may be displayed, modified, or reinterpreted by another technique without saving the output to an image file or de-installing any of the techniques. Two products released by Apple, Inc. of Cupertino, Calif., "Aperture" (version 1.0) and "iPhoto" have allowed for RAW interpreting RAW image data without storing a file describing the fully defined pixels, but among other difference, "Aperture" (version 1.0) and "iPhoto" do not allow the RAW image data to be interpreted by a specific technique of a plurality of techniques that are all concurrently available to interpret the RAW data.

Figure 3:
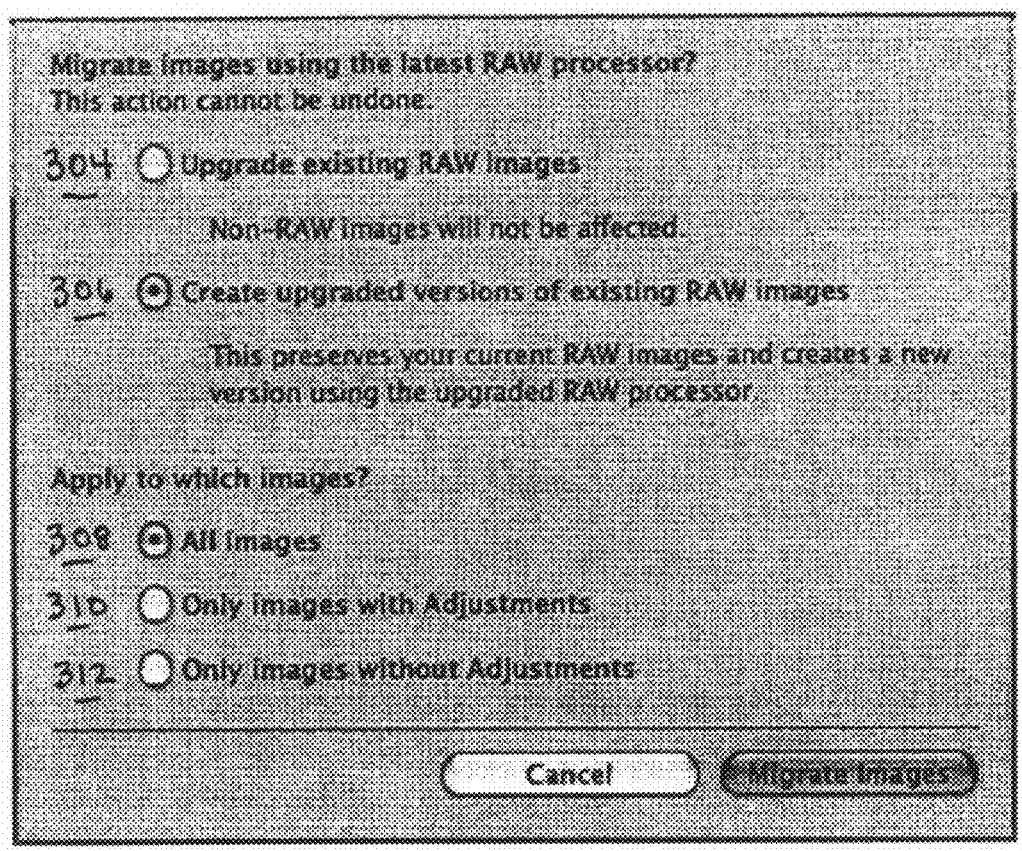
FIG. 3 illustrates an example graphical user interface element that allows a user to choose how to migrate existing images that are stored in a RAW format and interpreted according to a particular technique to being interpreted according to a new technique.

FIG. 3 illustrates an example graphical user interface element that allows a user to choose how to migrate existing images, which are stored in a RAW format and interpreted according to a particular technique, to being interpreted according to a new technique. For purposes of this application, the term "migrate" means to cause existing image data to be interpreted according to this new technique. For example, a user may have a library of 300 images each stored in a RAW format representing the underlying sensor data of the images. Once a new technique for interpreting the sensor data has been made available, for example by upgrading the image management and processing program with which the images are associated, then a dialog box 302 is presented to the user offering options for dealing with the existing image data.

According to an embodiment, a choice may be presented that causes all existing images to be interpreted using the new technique 304. This will cause the 100 images stored in a RAW format to be displayed as interpreted by the new technique instead of the prior technique. This may cause the display of the images to change, although according to an embodiment, the underlying sensor data, as stored in a RAW format file, does not change. The new display may be stored in an instruction set or according to another approach.

In an embodiment as illustrated by FIG. 3, another choice may be presented that causes new versions of all existing images to be created, where the new versions are displayed as interpreted by the new technique 306. Versions are described, for example, in pending non-provisional application Ser. No. 10/960,888, filed on Oct. 6, 2004, by Randy Ubillos, Laurent Perrodin, Dan Waylonis, Stan Jirman, Sarah Brody and Mike Mages, entitled "Displaying Digital Images using Groups, Stacks, and Version Sets," the contents of which are incorporated herein by reference.

This approach allows for each image to have multiple versions, each version of an image being displayed as interpreted by the respective technique that created it. According to an embodiment, any number of techniques for interpreting images may be available; for example, there may be ten different algorithms for interpreting sensor data, each one capable of being used to interpret sensor data. As an example, if ten techniques for interpreting sensor data are available, for example an image management/processing program incorporating an algorithm for interpreting sensor data having been upgraded ten times, the versioning approach just described could be used on a single RAW file each time the upgrade was performed, resulting in ten versions of the image, each displayed according to the particular technique that was introduced when the new version was created. Further, each of the versions may be interpreted by any of the available techniques at any time by performing the approaches described herein.

In an embodiment as illustrated by FIG. 3, the application of the new technique to the image data may be chosen depending on a status of the images. For example, the new technique may be applied to all images 308. Another option may be to apply the new technique only to those images which have been adjusted 310, which would be images that have had modifications applied to them, such as by improving exposure, increasing edge sharpness, or eliminating dust spots, and apply the previous technique to the remaining images. Another option may be to apply the new technique only to those images which have not been adjusted 312, and apply the previous technique to the remaining images.

Figure 4A:
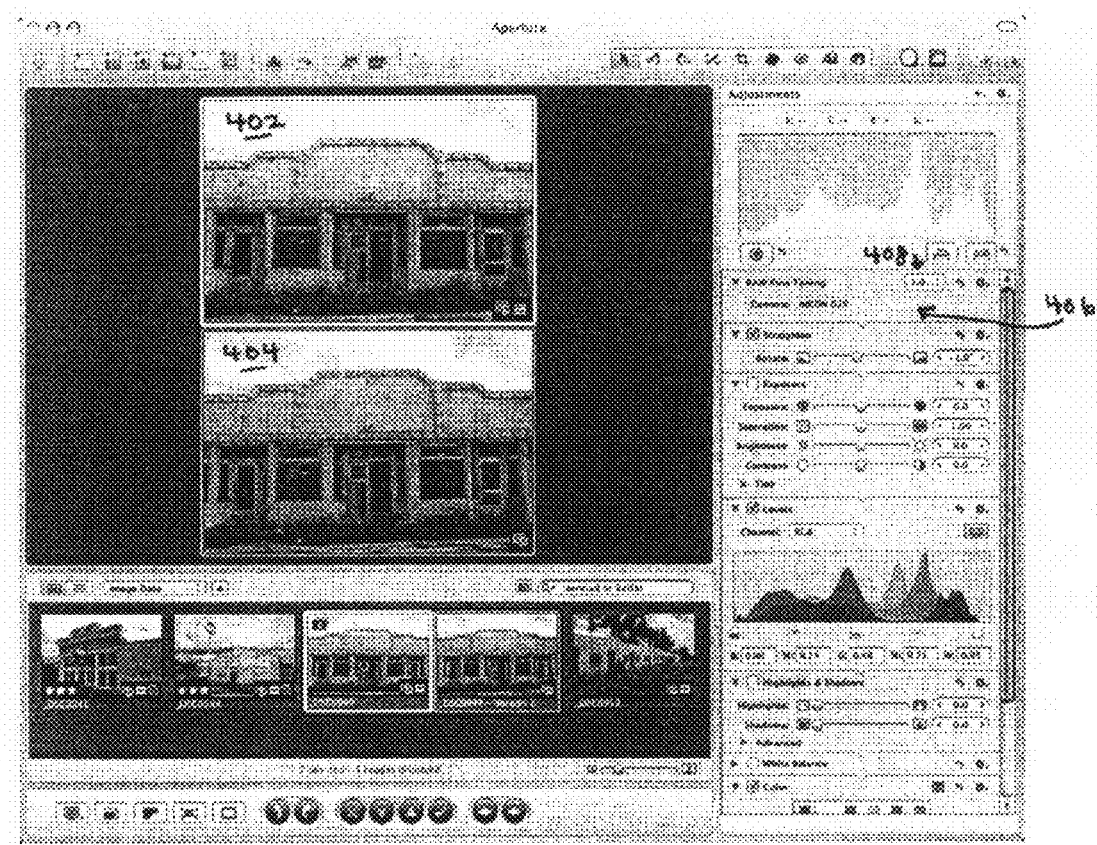
FIG. 4A illustrates an example concurrent display of the same unmodified sensor data as interpreted by multiple techniques.

FIG. 4A illustrates an example concurrent display of the same unmodified sensor data as interpreted by multiple techniques. FIG. 4A illustrates how a user may easily compare two implementations of a RAW processing technique, or any other processing technique that may have multiple versions of available techniques, such as filters. In FIG. 4A, a digital image is displayed twice, the top display 402 being the underlying sensor data as interpreted by a first technique, and the bottom display 404 being the same underlying sensor data as interpreted by a second technique. According to an embodiment, one or both of the displayed digital images 402, 404 may be versions of a digital image.

In FIG. 4A, the top displayed digital image 402 is selected, and in response, a particular display of user interface controls 406 are displayed. According to an embodiment, the particular display of user interface controls is based upon which iteration of the interpretation technique is being used to interpret the selected digital image or version of the digital image. In FIG. 4A, a graphical user interface element 408 is displayed that indicates which technique of a plurality of techniques is being used to interpret the selected digital image. In FIG. 4A, a pop-up dialog box is being used, although any type of graphical user interface element is envisioned as being used for this purpose. In this example, "version 1.0" of a RAW interpretation algorithm is being used to interpret and display the top digital image 402.

According to an embodiment, a user may select the graphical user interface element 408 and choose any one of a number of available RAW interpretation algorithms to interpret the selected displayed digital image. For example, a user may select the top displayed digital image 402, in which case the graphical user interface element 408 will change to indicate that the "version 1.0" algorithm is being used to interpret the selected displayed digital image. The user may then select the graphical user interface element 408 and choose a "version 2.0" of the available RAW interpretation algorithms, or any other version available in the user interface element 408. In response, the selected displayed digital image 402 will be displayed according to the "version 2.0" technique instead of the previously-used "version 1.0." The newly-selected technique may automatically alter the display of the digital image, because the underlying sensor data is being interpreted by the "version 2.0" technique in a different manner than by the "version 1.0" technique. According to an embodiment, any number of digital images may be selected and the underlying interpretation changed by use of a user interface element or user command, an example as illustrated by FIG. 4A.

According to an embodiment, a user may select any number of contiguous or non-contiguous digital images, albums, libraries, stacks, versions, or any other grouping or collection of digital images and use a user interface element or user command to choose which technique of any number of available techniques with which to interpret the sensor data underlying the digital images comprising the grouping or collection. This may be referred to as "migrating" the selected images to a different technique for interpretation of the sensor data. Stacks and Versions are described, for example, in pending non-provisional application Ser. No. 10/960,888, filed on Oct. 6, 2004, by Randy Ubillos, Laurent Perrodin, Dan Waylonis, Stan Jirman, Sarah Brody and Mike Mages, entitled "Displaying Digital Images using Groups, Stacks, and Version Sets," the contents of which are incorporated herein by reference.

Because there may be any number of available techniques available, the graphical user interface element 408 may be modified to clarify the available techniques. For example, if five techniques are available, each being labeled in a drop-down dialog box as "version 1.0" through "version 5.0," respectively, a user may add to or change the wording in the graphical user interface element 408 to allow for easier selection of a particular technique. "Version 1.0" may be changed to read "Version 1.0—desaturated colors," while "version 2.0" could be changed to read "second version—need to adjust white balance." By annotating the graphical user interface element 408 in this manner, a user does not have to remember specific properties of the available techniques or choose from a confusing list of non-specific version numbers.

Other approaches for selecting a particular technique for interpreting a particular digital image are envisioned. For example, a user may select one or more digital images, activate an interface command such as right-clicking a mouse, selecting a keyboard command, or a combination of the two, and this will cause a user interface element to be displayed from which a user may choose a particular technique of one or more available techniques to interpret the sensor data underlying the digital image.

Figure 4B:
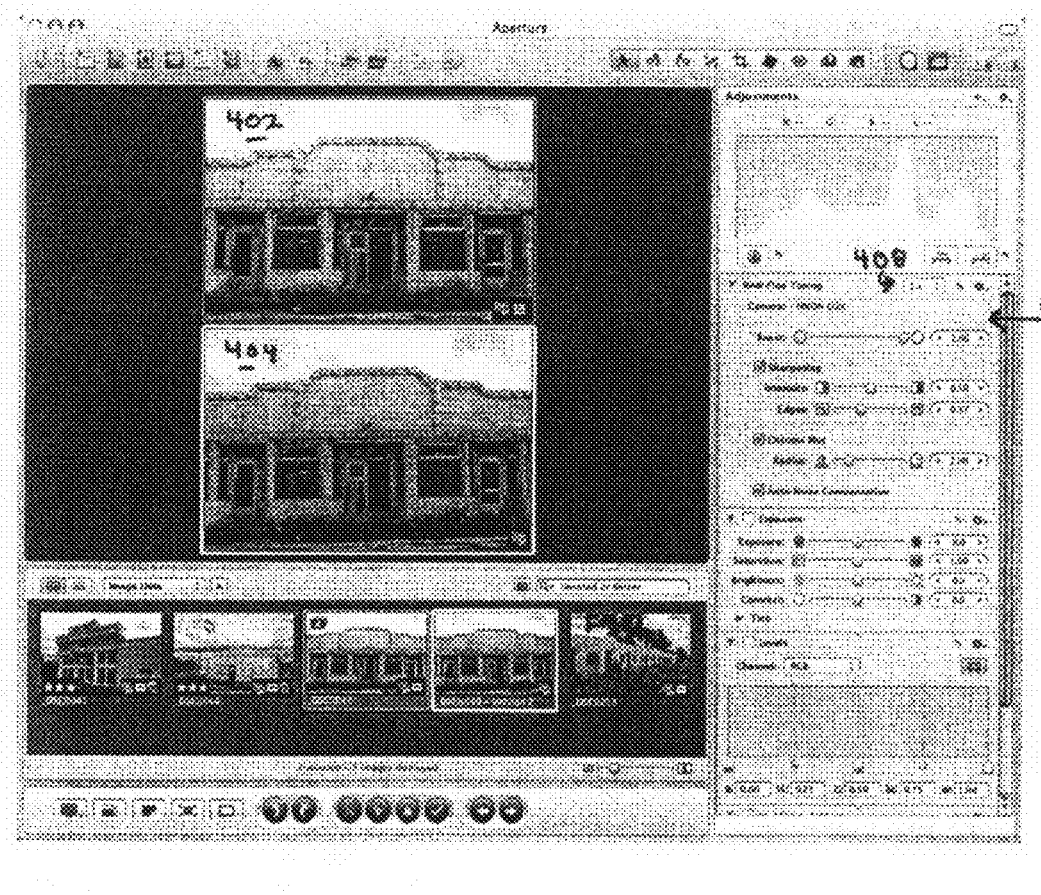
FIG. 4B illustrates an example concurrent display of the same unmodified sensor data as interpreted by multiple techniques.

FIG. 4B illustrates an example concurrent display of the same unmodified sensor data as interpreted by multiple techniques. In FIG. 4B, a digital image is displayed twice, the top displayed digital image 402 being the underlying sensor data as interpreted by a first technique, and the bottom displayed digital image 404 being the same underlying sensor data as interpreted by a second technique. According to an embodiment, one or both of the displayed digital images 402, 404 may be versions of a digital image. Versions are described, for example, in pending non-provisional application Ser. No. 10/960,888, filed on Oct. 6, 2004, by Randy Ubillos, Laurent Perrodin, Dan Waylonis, Stan Jirman, Sarah Brody and Mike Mages, entitled "Displaying Digital Images using Groups, Stacks, and Version Sets," the contents of which are incorporated herein by reference.

In FIG. 4B, the bottom digital image 404 is selected, and in response, a particular display of user interface controls 410 are displayed. This particular display is different from the particular display 406 of FIG. 4A, because the selected digital image 404 is interpreted by a different technique than the technique used to interpret the top digital image 402. This may be seen from the different appearance of the graphical user interface element 408 in FIG. 4B as compared to FIG. 4A. The graphical user interface element 408 in FIG. 4B indicates that the "version 1.1" algorithm is being used to interpret the selected digital image (the bottom digital image 404).

According to an embodiment, if a particular technique for interpreting sensor data offers features that are different from features offered by other available techniques, then user interface controls associated with the features offered by the particular technique currently selected will be displayed. For example, in FIG. 4B, the particular technique ("version 1.1") associated with the selected digital image (the bottom image 404) offers control over numerous parameters not offered by the "version 1.0" technique illustrated in FIG. 4A. In FIG. 4B, these parameters include "Boost," "Sharpening," "Chroma Blur," and "Auto Noise Compensation." User interface controls 410 associated with the "version 1.1" technique are displayed to the user. If the "version 1.0" technique were then selected for use with the selected digital image, the user interface controls 410 would change to reflect controls associated with the "version 1.0" technique.

Figure 5:
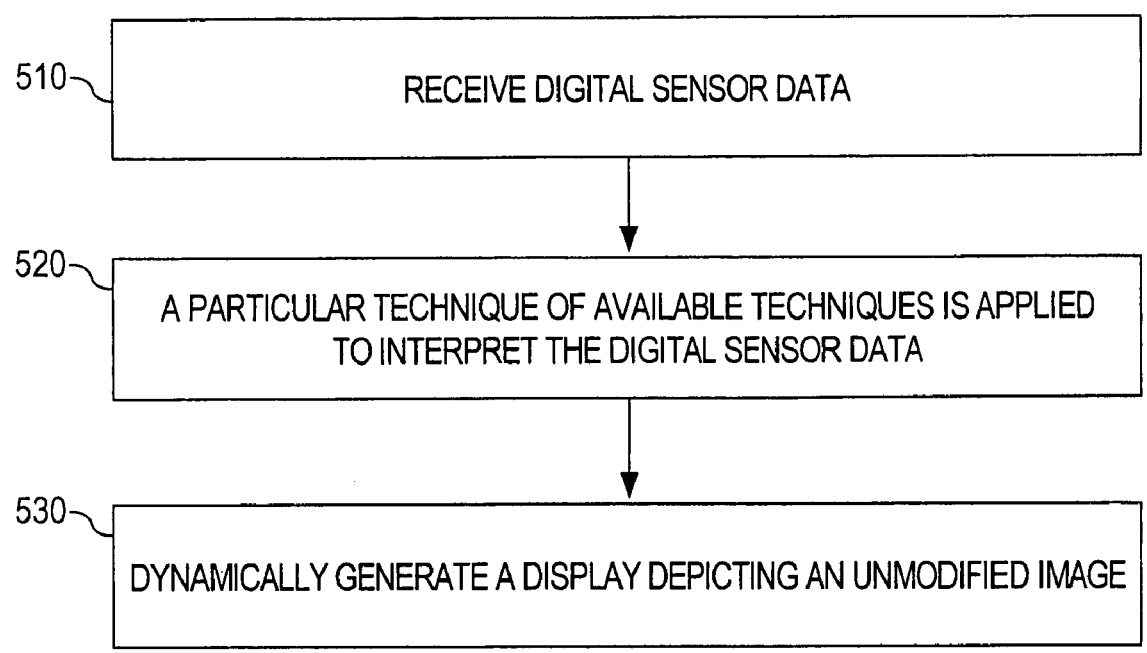
FIG. 5 is a flowchart illustrating the functional steps of migrating digital images according to an embodiment of the invention.

FIG. 5 is a flowchart illustrating the functional steps of migrating digital images according to an embodiment of the invention. The particular sequence of steps illustrated in FIG. 5 is merely illustrative for purposes of providing a clear explanation. Other embodiments of the invention may perform various steps of FIG. 5 in parallel or in a different order than that depicted in FIG. 5, and may comprise a subset of the various steps of FIG. 5 or additional steps.

In step 510, digital sensor data is received. The digital sensor data may be received in any of numerous ways. For example, after connecting a digital camera or storage card with RAW image data files stored on it to a computer, and importing the data files into a digital image management and processing application executing on the computer. The digital sensor data may be in the form of RAW image data files stored on non-volatile storage such as a DVD or hard drive. The step of receiving may include selecting a particular digital image that is based on sensor data, thereby causing the underlying sensor data to be selected. For example, selecting a digital image displayed in a digital image management and processing application where the digital image was generated from sensor data.

In step 520, a particular technique of concurrently-available techniques is applied to interpret the digital sensor data, such as one version of an algorithm where numerous versions are available for use. According to an embodiment, the techniques are used to interpret the sensor data and generate a display that depicts an unmodified digital image from the sensor data, the interpretation and/or display being generated in a different manner by each of the available techniques.

According to an embodiment, a particular technique of a number of available techniques to interpret sensor data, such as one version of an algorithm where numerous versions are available for use, is used as the "default" technique to interpret newly-acquired or newly-received sensor data. For example, there may be numerous digital images displayed in a library of digital images, each individual image display generated by interpreting the underlying sensor data with any one of a number of available techniques that were selected as the "default" when the particular digital sensor data was received. For example, in a library displaying five digital images, the first digital image display may have been generated by "version 1" of a sensor data interpretation technique, the second digital image display may have been generated by "version 2" of a sensor data interpretation technique, and similarly through the fifth digital image display that was generated by "version 5" of a sensor data interpretation technique, each sensor data interpretation technique having been the "default" when the particular sensor data was received.

In step 530, a display that depicts an unmodified image from the sensor data as interpreted by the particular technique is dynamically generated. According to an embodiment, reinterpreting the sensor data through a new technique is performed in response to user input, thereby existing images are not reinterpreted without a user's direct participation in the decision. This gives the user control over which technique of a number of techniques may be used to interpret the sensor data at any time. By dynamically interpreting and displaying the sensor data by any of a number of available techniques on command, users can revert to earlier implementations of RAW processing techniques without having to re-install or re-configure their software, such as re-installing a plug-in or prior technique for interpreting RAW files.

In one embodiment, a new version of the selected digital images is created, the new version displaying the underlying sensor data according to the particular technique chosen in response to the user input. For example, a user may select a display of a digital image previously generated and displayed by a technique "1.0" for interpreting sensor data and generating a display of an unmodified image from the sensor data. User input is then received that selects technique "2.0," this technique interpreting the sensor data and generating the display in a different manner than "1.0." In response, the image displayed using technique "1.0" is maintained and a new version of the image is created that displays the underlying sensor data according to technique "2.0." Versions are described, for example, in pending non-provisional application Ser. No. 10/960,888, filed on Oct. 6, 2004, by Randy Ubillos, Laurent Perrodin, Dan Waylonis, Stan Jirman, Sarah Brody and Mike Mages, entitled "Displaying Digital Images using Groups, Stacks, and Version Sets," the contents of which are incorporated herein by reference.

According to an embodiment, the user input that specifies which technique of the number of available techniques may include a "lift and stamp" operation, which is a type of "copy and paste" operation applied to digital images. According to an embodiment, a "lift-and-stamp" operation is a way to apply the technique used to generate a display from sensor data that is associated with one version to any other version of a digital image. For example, the user configures the settings for one version of a digital image, then uses lift-and-stamp to apply the exact same settings to other versions of the digital image. A "lift and stamp" operation may be used to change RAW processing parameters as well as any other piece of metadata simultaneously.

According to an embodiment, any modifications to an image may be maintained when interpreting the image according to a new technique. For example, a digital image may be displayed as interpreted from the underlying sensor data. Modifications may then be made to the displayed image; for example, removing dust spots or red-eye. A user may then desire to interpret the sensor data underlying the modified image according to a newly-available technique. According to an embodiment, the operation or operations performed to produce the modified image (dust removal, for example) are maintained when applying the new technique, for example by being automatically performed again or by simply being maintained. According to an embodiment, a user may choose which, if any, modifications to keep after interpreting the sensor data according to a new technique. A user interface element may be displayed requesting user input regarding which modifications to maintain.

According to an embodiment, the described approaches may be applied to any type of technique that may have more than one available version of the technique. For example, there may exist five different sharpening techniques available. Using the described approaches, a user may select which of the available sharpening techniques to apply to a digital image. For example, a user may specify a particular technique, of a plurality of techniques, to use to sharpen a digital image, and the digital image may be displayed in accordance with the selected technique. A new version of the sharpening technique is then received and made available, for example by being installed. This step does not result in the previous technique becoming unavailable. For example, installing a new version of the sharpening algorithm does not de-install or otherwise make unavailable the previous version.

The user selects the previously-modified image and selects the new version of the sharpening algorithm that has been made available. The digital image is then displayed in accordance with the selected new technique. A new version of the image, as described above, may be created. After applying the new version of the sharpening algorithm, a user may, at any time, decide to apply the older technique. The user selects the digital image with the newer technique applied and chooses the previous version of the technique, this step not making the newer technique unavailable, for example by requiring the user to de-install it. This is unlike previous approaches which allow only one version of a particular technique to be available at any one time. The selected digital image is then displayed in accordance with the selected prior technique.

Implementing Mechanisms

Figure 6:
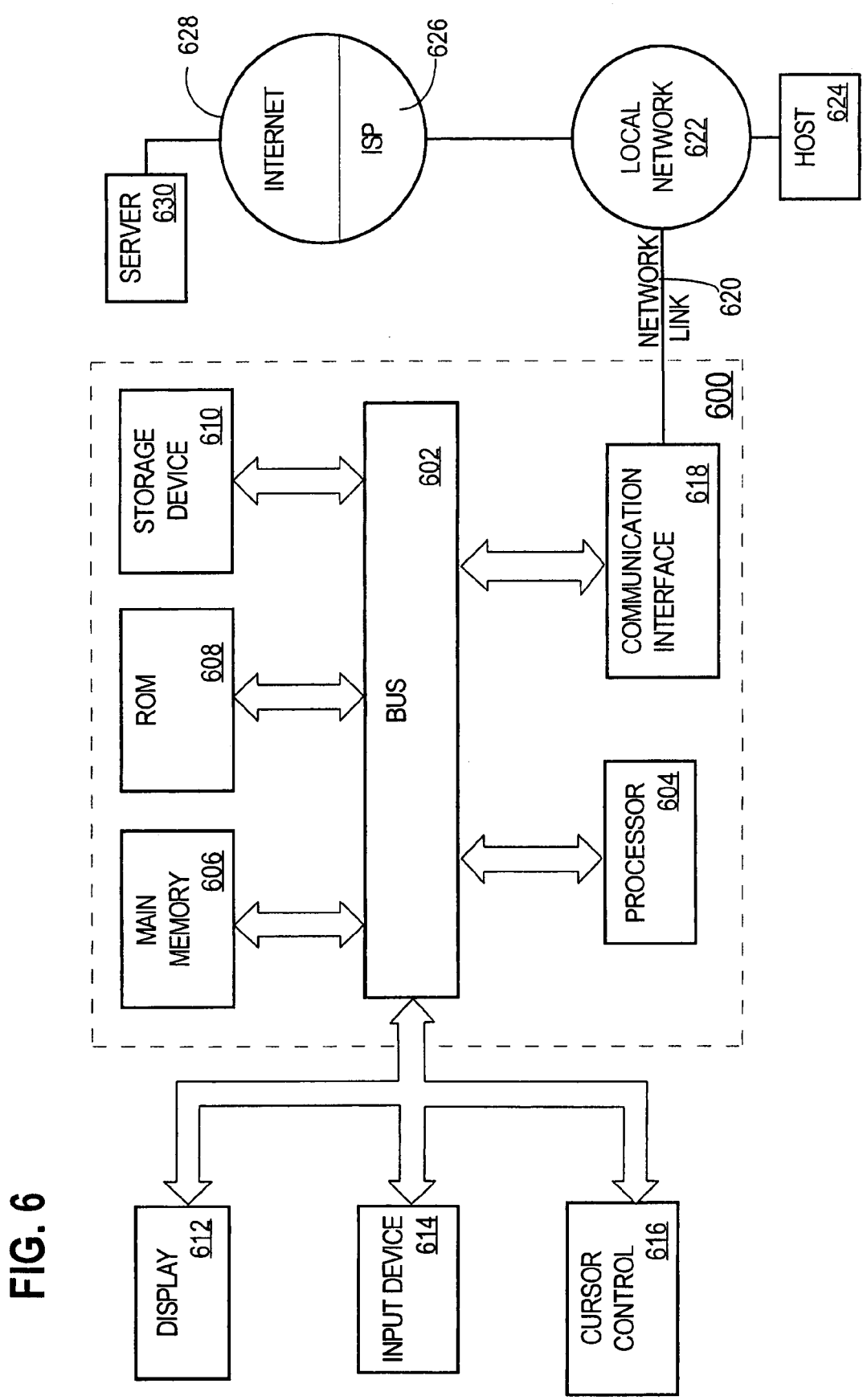
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    accessing digital sensor data generated by an image sensor, wherein the digital sensor data describes light sensed by the image sensor;
    accessing image version data associated with the digital sensor data, wherein the image version data indicates that a previous version of a particular technique was previously used for interpreting the digital sensor data to generate a previous version of a digital image;
    determining that both the previous version of the particular technique and a different version of the particular technique are available for interpreting the digital sensor data;

determining whether input has been received that selects the different version of the particular technique for interpreting the digital sensor data to generate a new version of the digital image;

if said input has been received, then generating the new version of the digital image using the different version of the particular technique;

if said input has not been received, then generating the new version of the digital image using the previous version of the particular technique;

wherein the method is performed by one or more computing devices.

2. The method of claim 1, further comprising:
in response to determining that the different version of the particular technique is available for interpreting the digital sensor data, notifying a user that the different version of the particular technique is available.

3. The method of claim 1, further comprising:
in response to determining that the different version of the particular technique is available for interpreting the digital sensor data, prompting the user to provide said input by selecting a particular version of the particular technique from at least the previous version of the particular technique and the different version of the particular technique.

4. The method of claim 1, wherein accessing the digital sensor data comprises reading the digital sensor data from a RAW file, wherein generating versions of the digital image comprises using an appropriate version of the particular technique to interpret the digital sensor data to generate at least one of: an RGB image; a JPEG image; a TIFF image; a bitmap image; or graphics data for outputting to a display device.

5. The method of claim 1,
wherein generating versions of the digital image comprises interpreting the digital sensor data to generate an unmodified base image using an appropriate version of the particular technique;
wherein the image version data further comprises data indicating one or more modifications to perform to the unmodified base image;
wherein generating the digital image further comprises modifying the unmodified base image in accordance with the one or more modifications to form the digital image.

6. The method of claim 1, wherein based on differences between the previous version of the particular technique and the different version of the previous technique, the previous version of the digital image is different from the new version of the digital image.

7. The method of claim 1, wherein the particular technique is specific to data produced by image sensors belonging to a particular set of devices manufactured by a particular manufacturer, and wherein the particular technique is not suitable for interpreting data produced by image sensors that belong to another set of devices manufactured by one or more other manufacturers.

8. The method of claim 1, wherein the digital image comprises data in at least one of: a TIFF format, a JPEG format, and RGB format, a bitmap format, or a format for transmitting to a display device.

9. The method of claim 1, further comprising:
displaying user interface controls that are associated with the particular technique;
wherein the previous version of the particular technique and the different version of the particular technique are each associated with a different set of user interface controls corresponding to a different set of parameters for the particular technique.

10. The method of claim 1, wherein:
the digital sensor data comprises a plurality of digital images stored as RAW files;
the different version of the particular technique has not yet been applied to interpret any of the plurality of digital images stored as RAW files; and
the method further comprises: in response to receiving user input selecting to migrate from the previous version of the particular technique to the new version of the particular technique, applying the different version of the particular technique to interpret the plurality of digital images stored as RAW files.

11. The method of claim 1, further comprising updating the image version data associated with the digital sensor data to indicate that the different version of a particular technique was used for interpreting the digital sensor data to generate the new version of a digital image.

12. The method of claim 1, further comprising, in response to determining that the different version of the particular technique is also available for interpreting the digital sensor data:
generating a first digital image based on interpreting the digital sensor data in accordance with the previous version of the particular technique;
generating a second digital image based on interpreting the digital sensor data in accordance with the different version of the particular technique;
concurrently displaying the first digital image and the second digital image.

13. The method of claim 12, further comprising:
displaying, in association with the first digital image and the second digital image, an interface for receiving, from a user, said input.

14. The method of claim 6, wherein the digital sensor data is stored in a non-volatile memory wherein the previous version of the digital image is also stored to the non-volatile memory, the method further comprising:
applying the different version of the particular technique to interpret the digital sensor data to generate the new version of the digital image; and
storing the new version of the digital image to the non-volatile memory without causing the digital sensor data to be modified in the non-volatile memory.

15. The method of claim 1, wherein accessing the digital sensor data comprises reading the digital sensor data from an image file stored in a RAW format.

16. One or more non-transitory computer-readable media storing instructions that, when executed by one or more computing devices, causes performance of the method of claim 1.

17. One or more non-transitory computer-readable media storing instructions that, when executed by one or more computing devices, causes performance of the method of claim 2.

18. One or more non-transitory computer-readable media storing instructions that, when executed by one or more computing devices, causes performance of the method of claim 3.

19. One or more non-transitory computer-readable media storing instructions that, when executed by one or more computing devices, causes performance of the method of claim 4.

20. One or more non-transitory computer-readable media storing instructions that, when executed by one or more computing devices, causes performance of the method of claim 5.

21. One or more non-transitory computer-readable media storing instructions that, when executed by one or more computing devices, causes performance of the method of claim 6.

22. One or more non-transitory computer-readable media storing instructions that, when executed by one or more computing devices, causes performance of the method of claim 7.

23. One or more non-transitory computer-readable media storing instructions that, when executed by one or more computing devices, causes performance of the method of claim 8.

24. One or more non-transitory computer-readable media storing instructions that, when executed by one or more computing devices, causes performance of the method of claim 9.

25. One or more non-transitory computer-readable media storing instructions that, when executed by one or more computing devices, causes performance of the method of claim 10.

26. One or more non-transitory computer-readable media storing instructions that, when executed by one or more computing devices, causes performance of the method of claim 11.

27. One or more non-transitory computer-readable media storing instructions that, when executed by one or more computing devices, causes performance of the method of claim 12.

28. One or more non-transitory computer-readable media storing instructions that, when executed by one or more computing devices, causes performance of the method of claim 13.

29. One or more non-transitory computer-readable media storing instructions that, when executed by one or more computing devices, causes performance of the method of claim 14.

30. One or more non-transitory computer-readable media storing instructions that, when executed by one or more computing devices, causes performance of the method of claim 15.

* * * * *

UNITED STATES PATENT AND TRADEMARK OFFICE
CERTIFICATE OF CORRECTION

| | | |
|---|---|---|
| PATENT NO. | : 7,936,946 B2 | Page 1 of 1 |
| APPLICATION NO. | : 11/710109 | |
| DATED | : May 3, 2011 | |
| INVENTOR(S) | : Nikhil M. Bhatt et al. | |

It is certified that error appears in the above-identified patent and that said Letters Patent is hereby corrected as shown below:

On Title page 2, item [56] in column 2, under "Other Publications", line 35, delete "magnifieir" and insert -- magnifier --, therefor.

In column 7, line 9, delete "use" and insert -- user --, therefor.

Signed and Sealed this
Thirteenth Day of December, 2011

David J. Kappos
*Director of the United States Patent and Trademark Office*